Patented Aug. 4, 1925.

1,548,768

UNITED STATES PATENT OFFICE.

HAROLD T. STOWELL, OF BUFFALO, NEW YORK, ASSIGNOR TO NATIONAL ANILINE & CHEMICAL CO., INC., OF NEW YORK, N. Y., A CORPORATION OF NEW YORK.

PRODUCTION OF QUINIZARINE GREEN.

No Drawing. Application filed August 16, 1924. Serial No. 732,576.

*To all whom it may concern:*

Be it known that I, HAROLD T. STOWELL, a citizen of the United States, residing at Buffalo, in the county of Erie, State of New York, have invented certain new and useful Improvements in the Production of Quinizarine Green; and I do hereby declare the following to be a full, clear, and exact description of the invention, such as will enable others skilled in the art to which it appertains to make and use the same.

The present invention relates to the production of arylamino derivatives of anthraquinone from quinizarine, and more particularly the di-p-toluido derivative known as quinizarine green.

The production of arylamino derivatives by the condensation of quinizarine, or of leuco-quinizarine, or a mixture comprising both, with primary aromatic amines in the presence or absence of condensing agents is well known. According to the conditions under which the condensation is carried out, one molecular proportion of quinizarine or of leuco-quinizarine enters into reaction or condensation with one or with two molecular proportions of the amine. In general, an excess of the aromatic amine has been heretofore employed as the solvent or diluent in these reactions, although certain other solvents or diluents, such as alcohol and acetic acid, have been also proposed.

I have now found that the condensation of quinizarine or of leuco-quinizarine, or a mixture of both, with primary aromatic amines can be advantageously carried out in the presence of halogenated aromatic hydrocarbons as a solvent or diluent. Of the various halogenated aromatic hydro-carbons employed as solvents or diluents, I have found the chlorinated derivatives of benzene particularly useful, and more especially crude o-dichlorbenzine. Crude or technical o-dichlorbenzene is chiefly a mixture of chlorine derivatives of benzene, mostly 1.2-dichlorbenzene, and is a liquid at ordinary temperatures. Further, the reduction of quinizarine to leuco-quinizarine and the condensation with primary aromatic amine to produce mono- or dianilido derivatives can be combined and carried out in one operation in the presence of said solvents or diluents.

Among the advantages offered by the use of halogenated aromatic hydrocarbons as solvents or diluents are their comparatively low cost, ease of recovery, suitable boiling point, and inertness toward the materials used in the reaction. By their use, the relative quantity of primary amine heretofore usually employed can be greatly reduced. Moreover, their solvent power is such that they offer an excellent means of directly obtaining a purified condensation product, particularly in the production of quinizarine green. This means of purification allows the use of a more impure quinizarine or leuco-quinizarine as initial material than might be otherwise expedient.

Although the process of the present invention may be carried out in the presence or absence of atmospheric air and in the presence or absence of a reducing agent or a condensing agent, yet the preferred practice is to effect reduction and condensation conjointly in a single operation in the presence of air.

The following example will further illustrate the invention, but it will be understood that the invention is not limited thereto. The parts are by weight.

Example: 80 parts quinizarine, 100 parts p-toluidine and 40 parts benzoic acid are dissolved in 480 parts technical o-dichlorbenzene at about 50°–55° C., and to the well-stirred solution there is gradually added 10 parts of zinc dust over a period of about one-half hour. Heat is evolved and the temperature usually rises to about 70°–75° C. After the zinc is added, the mixture is heated and the temperature brought to about 135° C. in 1 to 2 hours, and then to about 155°–160° C. in another hour. The temperature of the mixture, while stirring, is maintained at about 155°–160° C. for a further 5 hours, or until the condensation is complete, the water formed in the reaction being allowed to escape. When the condensation is complete, the mixture is cooled, while stirring, to about 25° C. The condensation product, which is composed principally of 1.4-di-p-toluidoanthraquinone or quinizarine green, crystallizes out and is filtered off. The solvent in the filtrate can be recovered by steam distillation or in any other suitable manner. The crystalline precipitate is then suspended in about 1000 parts water and the suspension subjected to the direct action of a current of steam for 10–15 minutes, then slightly acidified by the addition of dilute sulphuric acid (usually about 30 to 35 parts of 45 to 50 percent sulphuric acid being required) and the steam distillation continued until free from solvent. The product is then filtered off, and washed with hot water until free from acid. It is then dried. The product thus obtained is of excellent purity and may be ordinarily used as an intermediate in the preparation of other compounds without further purification.

In the above example, instead of allowing the condensation product to crystallize out by cooling the reaction mixture, it may be poured into water, subjected to steam distillation to remove the solvent, and the product finally recovered in any well known or suitable manner. The condensation product isolated in this manner is usually less pure than that obtained by direct crystallization from the solution; but, if desired, it may be purified in any well known manner.

In the above example, it is presumed that a portion of the quinizarine is reduced by the zinc dust and benzoic acid to leuco-quinizarine which, under the action of the zinc salt or excess of acid, or both, condenses with the p-toluidine to form leuco-quinizarine green. The leuco compound is then oxidized to quinizarine green by quinizarine which in turn is reduced to leuco-quinizarine which then condenses with more p-toluidine. Any remaining leuco compound is finally oxidized by the air. In place of benzoic acid, boric acid, acetic acid, hydrochloric acid, etc., and in place of zinc, stannous chloride, etc., may be used. Other forms of metallic zinc than zinc dust may also be used. The amount of crude o-dichlorbenzene may be also varied, but it is preferred to have enough present to effect solution of the initial material but avoiding an excess as will prevent the condensation product from crystallizing out of the cooled solution at the completion of the reaction. By using, in the above example, about one-third to one-half as much p-toluidine and carrying out the condensation at a temperature somewhat lower, for example, at about 120°–140° C., a mono-p-toluido derivative can be obtained; and mono chlorbenzene may also be used as the solvent in this case. It will be understood that leuco-quinizarine, or a mixture of quinizarine and leuco-quinizarine, can be used in place of quinizarine in the above example.

In a similar or analogous manner to that described above, the condensation of other amines with quinizarine, or leuco-quinizarine, or a mixture of both, may be effected whereby mono-anilido or di-anilido derivatives can be obtained. By anilido derivatives is meant those arylamino derivatives which may be derived from aniline or its homologues.

In the claims, it is understood that the term "quinizarine compound" includes quinizarine and leuco-quinizarine.

I claim:

1. In the production of anilido derivatives by the condensation of a quinizarine compound with a primary aromatic amine, the step which comprises causing the condensation to occur in the presence of a halogenated aromatic hydrocarbon.

2. In the production of a p-toluido derivative by the condensation of a quinizarine compound with p-toluidine, the step which comprises causing the condensation to occur in the presence of a chlorobenzene.

3. In the production of a di-p-toluido derivative by the interaction of a quinizarine compound and p-toluidine, the step which comprises causing the reaction to occur in the presence of technical o-dichlorbenzene.

4. In the production of a di-p-toluido derivative by the interaction of a quinizarine compound and p-toluidine in the presence of a technical o-dichlorbenzen solvent, the step which comprises cooling the solvent after the completion of the reaction to crystallize the di-p-toluido derivative therefrom, and subsequently separating the resulting precipitate.

5. The process of producing quinizarine green, which comprises treating quinizarine with p-toluidine in the presence of technical o-dichlorbenzene and a reducing agent and a condensing agent, and in the presence of air.

6. The process of producing a p-toluido derivative of anthraquinone, which comprises subjecting quinizarine to the action of p-toluidine in the presence of technical o-dichlorbenzene, benzoic acid, and zinc.

7. In the process of producing quinizarine green by heating a quinizarine compound with p-toluidine in the presence of technical o-dichlorbenzene, the step which comprises allowing the water which is formed to escape during the reaction.

8. The process of purifying a product obtainable by the condensation of a quinizarine compound with a primary aromatic amine which comprises crystallizing the product from a halogenated aromatic hydrocarbon solution.

9. The process of purifying quinizarine green which comprises crystallizing quinizarine green from a chlorbenzene solution.

10. The process of purifying quinizarine green which comprises crystallizing quinizarine green from an o-dichlorbenzene solution.

In testimony whereof I affix my signature.

HAROLD T. STOWELL.